United States Patent [19]

Christe

[11] Patent Number: 4,695,296
[45] Date of Patent: Sep. 22, 1987

[54] METHOD FOR THE SELECTIVE SEPARATION OF GASES

[75] Inventor: Karl O. Christe, Calabasas, Calif.

[73] Assignee: Rockwell International Corporation, El Segundo, Calif.

[21] Appl. No.: 739,806

[22] Filed: May 31, 1985

[51] Int. Cl.$^4$ .............................................. B01D 53/04
[52] U.S. Cl. ........................................... 55/68; 55/75; 502/60
[58] Field of Search ................ 55/68, 75; 502/36, 60, 502/85

[56] References Cited

U.S. PATENT DOCUMENTS

| | | | |
|---|---|---|---|
| 3,061,654 | 10/1962 | Gensheimer et al. | 55/75 X |
| 3,078,637 | 2/1963 | Milton | 55/75 X |
| 3,078,638 | 2/1963 | Milton | 55/75 X |
| 3,078,639 | 2/1963 | Milton | 55/75 X |
| 3,266,221 | 8/1966 | Avery | 55/75 X |
| 3,305,656 | 2/1967 | Devins | 55/75 X |
| 3,594,331 | 7/1971 | Elliott, Jr. | 502/60 |
| 3,630,965 | 12/1971 | Voorhies, Jr. et al. | 502/60 X |
| 3,644,220 | 2/1972 | Kearby | 502/60 X |
| 3,699,056 | 10/1972 | Takase et al. | 502/60 |
| 3,751,878 | 8/1973 | Collins | 55/68 X |
| 3,839,539 | 10/1974 | Elliott, Jr. | 502/60 X |
| 3,885,927 | 5/1975 | Sherman et al. | 55/75 X |
| 4,249,915 | 2/1981 | Sircar et al. | 55/75 X |
| 4,297,335 | 10/1981 | Lok et al. | 502/60 X |
| 4,356,156 | 10/1982 | Dyer et al. | 502/60 X |
| 4,472,178 | 9/1984 | Kumar et al. | 55/75 X |

*Primary Examiner*—Robert Spitzer
*Attorney, Agent, or Firm*—H. Fredrick Hamann; Harry B. Field; Clark E. DeLarvin

[57] ABSTRACT

A method for the selective removal of an oxide of carbon from a gas stream containing the same and a halogen which comprises contacting such a gas stream with a water-free, prehalogenated molecular sieve having a pore size of at least 4 angstroms whereby the oxide of carbon is selectively retained by the sieve without retention of the halogen.

10 Claims, No Drawings

METHOD FOR THE SELECTIVE SEPARATION OF GASES

BACKGROUND OF THE INVENTION

1. Field of the Invention

The present invention broadly relates to a method for the selective removal of an oxide of carbon from a gas stream containing the same and an elemental halogen. In accordance with a particularly preferred embodiment, the invention provides a method for the selective removal of $CO_2$ from a gas stream containing the same and fluorine, which stream is obtained from a high-power, pulsed, chemical DF laser.

2. Description of the Prior Art

It is well known that carbon dioxide is readily removable from substantially inert gas streams by various methods. For example, the removal of carbon dioxide from a gas stream by reaction with a base is well known, as is the use of a molecular sieve for effecting such separation. Methods also have been suggested for the separation of weak acids such as $H_2S$ from gas streams containing the same and $CO_2$ by utilizing an absorbent which preferentially removes the $H_2S$ along with only a minor amount of $CO_2$.

The removal of carbon dioxide from a gas stream containing the same and a halogen presents a very difficult problem. More particularly, the halogens, and fluorine in particular, are the more reactive elements known whereas $CO_2$ is relatively inert. To the best of the inventor's knowledge, no expedient method for the selective removal of $CO_2$ from a fluorine-containing gas exists, though the need for such a method does exist for use in conjunction with a pulsed chemical deuterium fluoride (DF) laser.

In a pulsed DF laser, molecular fluorine is dissociated by a suitable energy source such as flash photolysis or an electron beam into atomic fluorine as exemplified by the following equation:

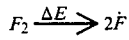

The atomic fluorine (F) then is reacted with deuteurium to produce the lasing species, vibrationally excited DF* which lases at a wavelength of about 3.8 $\mu$m, as exemplified by the following equation:

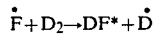

Typically, the gas utilized in a pulsed DF laser comprises about 95% helium as a diluent and the balance will include a four-fold excess of $F_2$ over $D_2$. To maintain a high efficiency and minimize the inventory of stored gas required for operation of the laser it is necessary to remove the ground state deuterium fluoride formed during lasing. Removal of the DF is accomplished in a suitable scrubber, typically one containing activated sodium fluoride. The remaining helium diluent and the unused fluorine are recycled to the laser.

A particular advantage of a DF laser is its dual wavelength capability. Specifically, it has been found that excited DF can efficiently transfer its energy to $CO_2$ which can lase at a wavelength of 10.6 $\mu$m. Thus, the laser can be operated either on the DF or the $CO_2$ lines. An important requirement for dual wavelength operation, however, is the ability to switch from one mode to the other without sacrificing the advantages gained by the gas recirculation. Since switching from $CO_2$ lasing to DF lasing requires removal of the $CO_2$, an effective method for the selective removal of $CO_2$ from the fluorine-containing gas stream is essential.

SUMMARY OF THE INVENTION

The present invention provides a means for the selective removal of an oxide carbon from a gas stream containing the same and an elemental halogen. Broadly, the present invention comprises passing such a gas stream through a pretreated molecular sieve whereby the oxide of carbon is selectively retained by the sieve and the halogen along with the other constitutents of the gas stream pass therethrough. The molecular sieve must be pretreated and have a pore size of at least four angstroms (Å). The pretreatment comprises rendering the molecular sieve substantially inert towards the halogen by (1) removal of all free water from the sieve and (2) by halogenation of the sieve until it is completely stable (inert) towards the halogen. It has been found that such a treatment changes the chemical properties of the molecular sieve and results in a sieve which will selectively remove oxides of carbon from a gas stream containing the same and a halogen. The selection of the specific molecular sieve is not critical but it will generally comprise a zeolite or, as they are often referred to, an aluminosilicate.

It is a particular advantage of the present invention that it provides a method for the selective removal of carbon dioxide from a gas stream containing the same and a highly reactive halogen such as fluorine. Thus, the present invention is particularly suited for the treatment of a gas from a dual mode DF laser which is to be switched back from $CO_2$ to deuterium fluoride lasing.

It is therefore an object of the invention to provide a method for the selective removal of $CO_2$ from a fluorine-containing gas stream.

A broader object of the invention is to provide a method for the selective removal of an oxide of carbon from a gas stream containing same and at least one elemental halogen.

Another object of the invention is for the selective removal of $CO_2$ from a gas stream containing the same and fluorine which is devoid of complexity, relatively light in weight, and thus suitable for use in space applications.

A more specific object of the invention is to provide a process which will remove $CO_2$ but will not remove either fluorine or helium from a recirculating gas obtained from a dual wavelength, pulsed, chemical deuterium fluoride laser.

These and other objects, advantages and novel features of the present invention will be more readily apparent from the following detailed description.

DESCRIPTION OF A PREFERRED EMBODIMENT

In accordance with the present invention, a gas stream containing an oxide of carbon and a halogen is passed through a pretreated molecular sieve having a pore size of at least about 4 angstroms whereby the oxide of carbon is selectively removed and retained in the sieve. The molecular sieves utilizable in accordance with the present invention may be characterized as zeolites which are crystaline aluminosilicates of group 1-A and group 2-A elements and may be represented by the general formula

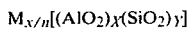

where n is the valence of the cation M, X and Y are the total number of tetrahedra per unit cell, and Y/X typically may have a value of from 1 to about 100 and preferably of from 1 to about 5. Typical aluminosilicates suitable for use in accordance with the present invention, are commercially available molecular sieves such as Linde's A or X types. The chemical composition of these materials is similar, the only variations are the ratio of $AlO_2$ to $SiO_2$ and the specific cations M. For example, the Linde types 4A, 5A and 13X may be represented, respectively, by the formulae

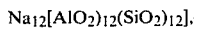

and

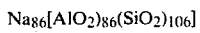

The key aspect of the present invention is the manner in which the molecular sieve (aluminosilicate) is treated. An aluminosilicate having a pore size of at least about 4 angstroms is first dried, preferably in a dynamic vacuum maintained at a temperature within a range of from about 200° to 300° C. to remove any free water therefrom. Thereafter, the aluminosilicate is slowly halogenated with an elemental halogen (such as fluorine) at a lower temperature, typically ambient. The reaction is exothermic and must be accomplished slowly to avoid subjecting the aluminosilicate to an excessive temperature. Generally, the halogenation of the aluminosilicate will be repeated until the aluminosilicate reaches a saturation level ie., will absorb no more halogen. This is readily determinable since the aluminosilicate will maintain a constant weight and no additional halogen will be taken up. The aluminosilicate so treated can then be used for the selective adsorption of an oxide of carbon, such as $CO_2$, from a gas mixture containing the same and the selected halogen.

The subject invention is particularly suitable for use in conjunction with a pulsed, dual wavelength, chemical deuterium fluoride laser which utilizes a recirculation gas system. The recirculation gas system will include both a DF scrubber (a high surface area body of a material, such as NaF, for removal of DF) and the $CO_2$ scrubber of the present invention arranged in series in the recirculation gas system flow loop. While the $CO_2$ removal method of the present invention will also be capable of removing some of the DF, generally a sodium fluoride based scrubber is much more efficient and will provide the desired low levels of ground state DF in the lasing gas which is essential for high power yields in a chemical DF laser.

To minimize the pressure drop or flow resistance in such a recirculation gas system, the materials utilized for removal of DF and $CO_2$ will preferably be in the form of a bed of granules or pellets confined in a housing. The precise size of granules or pellets, size of housing, depth of the bed and the like will be a function of, among other things, the flow rate of the recirculating gas and the quantity of DF and $CO_2$ to be removed.

The general nature of the invention having been set forth, the following example is presented as a specific illustration thereof. It will be understood that the invention is not to be limited in this specific example of a preferred embodiment but rather is susceptible to various modifications as will be apparent to one of ordinary skill in the art to which this invention pertains.

EXAMPLE

A 16.37 gram quantity of a commercially available molecular sieve (Linde type 4A) pellets was obtained and activated by heating to 300° C. under a dynamic vacuum to remove any water therefrom. The pellets were then placed into an alumina tube which was equipped with a valve and connected to a stainless steel vacuum source. The alumina tube was evacuated and the pellets contained within the tube repeatedly exposed to gaseous fluorine at substantially ambient temperature until the pressure of fluorine above the pellets remained constant over several hours and the pellets had attained a constant weight.

The alumina tube was then evacuated and about 1.3 millimoles of a gas mixture having a composition (mole %) He 52.0, $CO_2$ 41.7, $F_2$ 3.8, and HF 2.5 was introduced into the alumina tube containing the treated pellets. The gas was subsequently withdrawn and it was determined that the pellets had adsorbed 0.51 millimoles of gas and the pellets had increased in weight by 22 milligrams which corresponded to a molecular weight of the absorbed species of 43.1 (based on $CO_2=44$). Thus, this demonstrated that substantially quantitative adsorption of the $CO_2$ by the pellets was obtained (within the limits of the accuracy of the measurements taken). This essentially quantitative adsorption was further confirmed by an infrared spectrum of the residual gases which was recorded at 100 torr pressure. The spectrum did not show any detectable amount of $CO_2$.

As will be apparent to those skilled in the art, numerous modifications and variations of the present invention are possible in light of the above teaching. It is to be understood therefore, that within the scope of the appended claims, the invention may be practiced other than as specifically described herein.

What is claimed is:

1. A method for the selective removal of an oxide of carbon from a gas stream containing the same and an elemental halogen comprising: bringing the gas stream to be treated into contact with a water-free, molecular sieve which has been prehalogenated with elemental halogen whereby the oxide of carbon is selectively retained in the molecular sieve.

2. The method of claim 1 wherein the halogen is fluorine and the molecular sieve is prefluorinated.

3. The method of claim 1 wherein the oxide of carbon is $CO_2$.

4. The method of claim 1 wherein said oxide of carbon is $CO_2$ and said halogen is fluorine.

5. The method of claim 4 wherein said gas stream is the lasing medium of a dual wavelength, pulsed chemical DF laser.

6. The method of claim 5 wherein said gas stream consists essentially of a major amount of helium and a minor amount of $CO_2$ and fluorine.

7. The method of claim 1 wherein the molecular sieve is an aluminosilicate.

8. The method of claim 6 wherein said aluminosilicate has the composition $Na_{12}[AlO_2)_{12}(SiO_2)_{12}]$.

9. A method for the selective removal of $CO_2$ from a gas stream containing the same and fluorine comprising passing the gas stream through a bed of pellets consisting of an aluminosilicate having a pore size of at least about 4 angstroms which has been prefluorinated with elemental fluorine.

10. The method of claim 9 wherein said gas stream is the lasing medium of a dual wavelength pulsed chemical DF laser and comprises a major amount of helium, and said aluminosilicate has the composition $Na_{12}[(AlO_2)_{12}(SiO_2)_{12}]$.

* * * * *